United States Patent
Kakishima et al.

(10) Patent No.: US 7,613,143 B2
(45) Date of Patent: Nov. 3, 2009

(54) SYSTEM AND METHOD FOR CONTROLLING NETWORK, NETWORK CONTROLLING APPARATUS, AND MOBILE TERMINAL USED IN NETWORK CONTROL SYSTEM

(75) Inventors: Jun Kakishima, Yokohama (JP); Masahiro Sawada, Yokohama (JP); Takeshi Ihara, Yokosuka (JP); Shoichi Hirata, Fuchu (JP)

(73) Assignee: NTT DoCoMo, Inc., Tokyo (JP)

( * ) Notice: Subject to any disclaimer, the term of this patent is extended or adjusted under 35 U.S.C. 154(b) by 1068 days.

(21) Appl. No.: 10/778,113

(22) Filed: Feb. 17, 2004

(65) Prior Publication Data

US 2004/0252696 A1  Dec. 16, 2004

(30) Foreign Application Priority Data

Feb. 25, 2003 (JP) ............................. 2003-047762
Jun. 24, 2003 (JP) ............................. 2003-179814

(51) Int. Cl.
*H04B 7/216* (2006.01)
*H04J 3/16* (2006.01)
(52) U.S. Cl. .................. 370/328; 370/335; 370/342; 370/466
(58) Field of Classification Search .................. None
See application file for complete search history.

(56) References Cited

U.S. PATENT DOCUMENTS

| | | | |
|---|---|---|---|
| 5,390,365 A | 2/1995 | Enoki et al. | |
| 6,269,252 B1 * | 7/2001 | Hutchings et al. | 455/552.1 |
| 6,285,882 B1 * | 9/2001 | Cornillat et al. | 455/435.1 |
| 2002/0061750 A1 * | 5/2002 | Mohebbi | 455/437 |
| 2003/0096612 A1 * | 5/2003 | Kim et al. | 455/435 |
| 2004/0100924 A1 * | 5/2004 | Yam | 370/328 |

FOREIGN PATENT DOCUMENTS

| | | |
|---|---|---|
| EP | 1 180 906 A2 | 2/2002 |
| GB | 2 271 486 A | 4/1994 |
| JP | 60-74842 | 4/1985 |
| JP | 11-296444 | 10/1999 |
| JP | 2000-32032 | 1/2000 |
| JP | 2000-232447 | 8/2000 |
| WO | WO 02/28047 A2 | 4/2002 |

* cited by examiner

*Primary Examiner*—Melanie Jagannathan
(74) *Attorney, Agent, or Firm*—Oblon, Spivak, McClelland, Maier & Neustadt, L.L.P.

(57) ABSTRACT

A network control system, which controls connections between a mobile terminal and multiple types of wireless systems accommodated in a network, includes a prescribed node provided on the network. The node comprises signal transmitting/receiving means that transmits and receives a control signal defined by each of the wireless systems, protocol converting means that converts the control signal to a common protocol independent of each of the wireless systems, and entity communication controlling means that communicates with multiple functional entities provided on the network, using the common protocol, to implement network control.

15 Claims, 17 Drawing Sheets

FIG.6

| USER | AP ADDRESS | AR ADDRESS | WIRELESS QoS PARAMETER (REQUIRED QoS CLASS) | WIRELESS SCHEME INFORMATION | WIRELESS QUALITY INFORMATION |
|---|---|---|---|---|---|
| USER A | APa | ARa | ... | ... | ... |
| ... | ... | ... | ... | ... | ... |
| USER X | APc | ARb | ... | ... | ... |
| ... | ... | ... | ... | ... | ... |

FIG.13

| WIRELESS SCHEME A | ID=1 |
|---|---|
| WIRELESS SCHEME B | ID=1 |
| WIRELESS SCHEME C | ID=1 |

FIG.14

| WIRELESS SCHEME A | ID=1 | ID=$\alpha$ |
|---|---|---|
| WIRELESS SCHEME B | ID=1 | ID=$\beta$ |
| WIRELESS SCHEME B | ID=1 | ID=1 |
| WIRELESS SCHEME C | ID=1 | ID=1 |

FIG.18

| WIRELESS SCHEME | LOCATION REGISTRATION AREA PARTICULAR TO WIRELESS SCHEME | USER SUBSCRIPTION INFORMATION | USER PREFERENCE |
|---|---|---|---|
| WIRELESS SCHEME A | PRESENCE | PRESENCE | 1 |
| WIRELESS SCHEME B | PRESENCE | PRESENCE | 2 |
| WIRELESS SCHEME B | ABSENCE | PRESENCE | 2 |
| WIRELESS SCHEME C | ABSENCE | ABSENCE | 3 |

SYSTEM AND METHOD FOR CONTROLLING NETWORK, NETWORK CONTROLLING APPARATUS, AND MOBILE TERMINAL USED IN NETWORK CONTROL SYSTEM

BACKGROUND OF THE INVENTION

The present invention relates to a network control system realizing unified network management for heterogeneous wireless communication systems. The present invention also relates to a network control apparatus and a mobile terminal used in such a network control system.

It is expected that future mobile communications systems will be provided under a heterogeneous access environment that accommodates various types of wireless systems using different types of wireless schemes including next-generation wireless schemes, in addition to WCDMA (Wideband Code Division Multiple Access), which is the wireless scheme of third-generation mobile communications systems, and wireless LANs.

JPA 2000-32032 and its counterpart European Patent Application No. 98301053.9 disclose a network technique for managing multiple types of wireless systems. In these publications, networks corresponding to the respective wireless systems are constructed, and intersystem handover is implemented by carrying out roaming between networks.

However, this technique has several drawbacks when various types of wireless systems are accommodated in a common network.

In general, a wireless system and an internetwork interface are in one-to-one correspondence. For example, the switching technology for personal digital cellular (PDC), which is called the second-generation mobile communications system, is constructed making use of synchronous transfer mode (STM) aiming mainly at voice conversation services. Accordingly, an STM interface dedicated to PDC is provided to a PDC network. Similarly, the switching technology of the third-generation mobile communications system using WCDMA is constructed making use of asynchronous transfer mode (ATM) that is capable of high-rate data exchange and data transfer using various types of communication formats, such as speech and audio/visual data. Accordingly, an ATM interface dedicated to WCDMA is provided to a WCDMA network.

A PDC network and a WCDMA network are managed, operated, and maintained independently of each other. For this reason, Quality of Service (QoS) cannot be handed over during handover between heterogeneous wireless communication systems. In addition, when a PDC wireless system is added to a WCDMA network, an STM interface dedicated to the PDC system has to be newly added to the WCDMA network, which results in complicated network management and increased cost.

SUMMARY OF THE INVENTION

The present invention is conceived to overcome the above-described problems, and it is an object of the present invention to provide a network control system and a network control method realizing unified network management on a network accommodating heterogeneous wireless communication systems.

It is also an object of the invention to provide a network control apparatus and a mobile terminal (or station) used in such a network control system.

To achieve the object, in one aspect of the invention, a network control system for controlling connection of a mobile terminal to a network that accommodates multiple types of wireless systems is provided. The network control system includes a prescribed node provided on the network. The node comprises signal transmitting/receiving means that transmits and receives a control signal defined by each of the wireless systems, protocol converting means that converts the control signal to a common protocol independent of each of the wireless systems, and entity communication controlling means that communicates with multiple functional entities provided on the network, using the common protocol, to implement network control using the common protocol.

In another aspect of the invention, a network control apparatus provided on a network to control connection of a mobile terminal that moves across multiple types of wireless systems is provided. The network control apparatus comprises signal transmitting/receiving means that transmits and receives a control signal defined by each of the wireless systems; protocol converting means that converts the control signal to a common protocol independent of each of the wireless systems; and entity communication controlling means that communicates with a plurality of functional entities provided on the network to implement network control using the common protocol.

The protocol converting means analyzes the received control signal and converts the signal format of the control signal according to a prescribed rule.

The entity communication controlling means assigns and transmits the protocol-converted control signal to one of the functional entities according to a prescribed rule.

The entity communication controlling means receives the control signal containing information about wireless quality of a downlink signal from the mobile terminal, the downlink signal being transmitted from a wireless access point of each of the wireless systems to the mobile terminal. The entity communication controlling means also selects one of the functional entities that implements routing management based on information, and communicates with the selected functional entity using the common protocol.

The network control apparatus further comprises location registration ID managing means that manages a common location registration ID allocated in common to service areas defined by wireless access points of the multiple types of wireless systems; broadcasting means that causes the wireless access points to broadcast the common location registration ID; and location registration means that carries out location registration using the common location registration ID upon receiving a location registration request from the mobile terminal currently located in one of the service areas.

With the above-described arrangement, the network control apparatus receives and analyzes the control signal, and converts the control signal into a common protocol independent of the multiple types of wireless systems accommodated in the common network. Since the network control apparatus communicates with the functional entities for performing network control processes using the common protocol, differences in heterogeneous wireless systems are concealed from the functional entities. Consequently, mutual connectivity of the control signal is guaranteed without changing the spec of each functional entity (or adding an interface for each wireless system).

BRIEF DESCRIPTION OF THE DRAWINGS

Other objects, features, and advantages of the invention will become more apparent from the following detailed description when read in conjunction with the accompanying drawings, in which

FIG. 6 is an example of the AP-AR management table of the network controller;

FIG. 13 is an example of the table managed by the location registration manager;

FIG. 14 is an example of the table managed by the network controller;

FIG. 18 is an example table of data managed in the user preference management database.

DETAILED DESCRIPTION OF THE INVENTION

The present invention is described in detail below in conjunction with the attached drawings.

Figure 1:
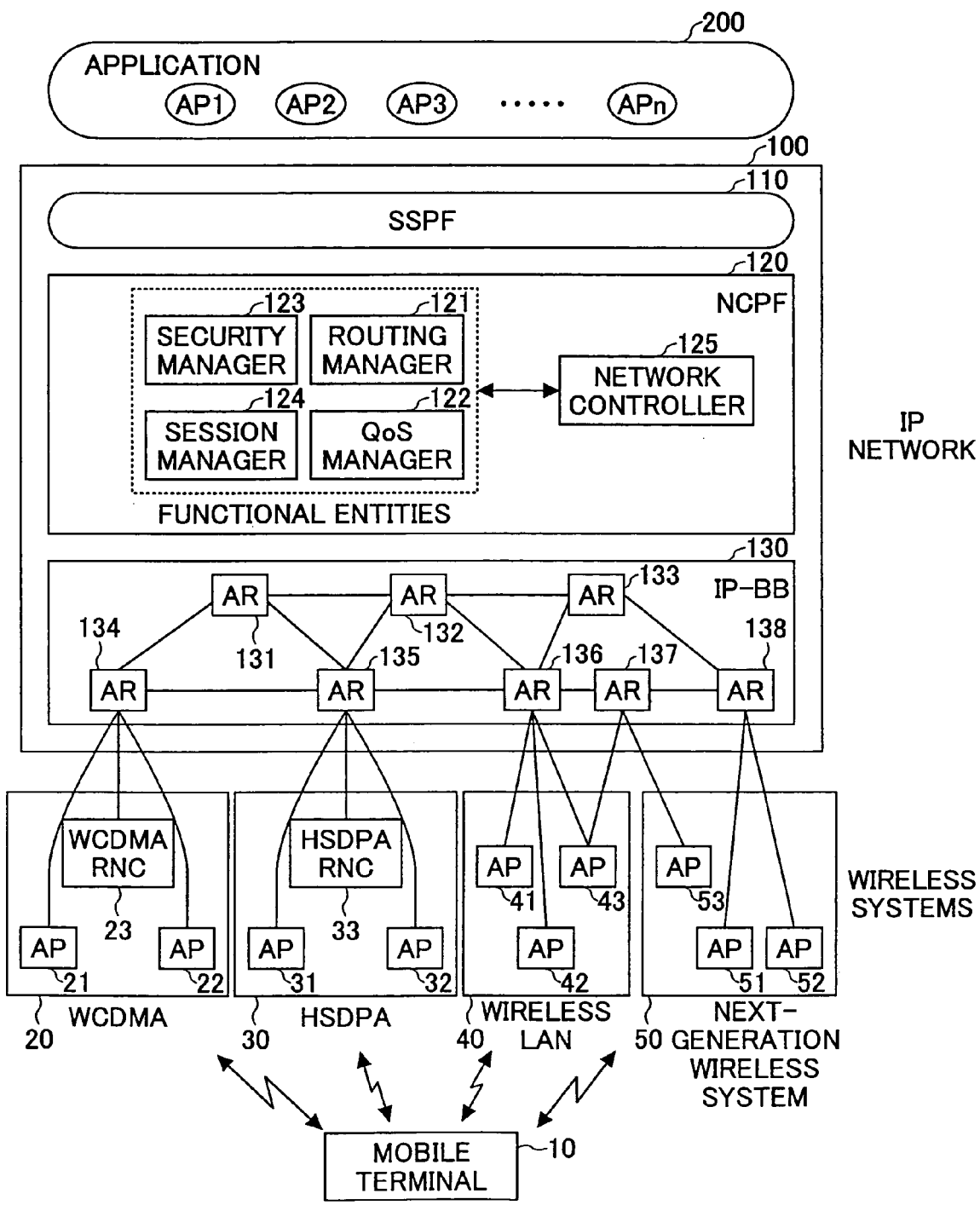
FIG. 1 is a schematic diagram of an example of the structure of the network control system according to an embodiment of the invention.

FIG. 1 shows the structure of the network control system according to an embodiment of the invention. The network control system includes a mobile terminal 10, various types of wireless communication systems 20-50, and an IP network 100 positioned as an upper layer above the wireless systems. The mobile terminal 10 is a hybrid wireless communication terminal capable of dealing with multiple wireless schemes, such as Wideband Code Division Multiple Access (WCDMA) as an IMT-2000 standard, High Speed Downlink Packet Access (HSDPA) that is an extended version of WCDMA, IEEE 802.11 wireless LAN standard, and ITM-2000 next-generation wireless scheme. Above the IP network 100 is an application layer 200.

In the example shown in FIG. 1, the WCDMA wireless system 20 includes access points (e.g., wireless base stations) 21 and 22 accessed from the mobile terminal 10, and a radio network controller (RNC) 23 for managing and controlling the radio resources. The HSDPA wireless system 30 includes access points 31 and 32 accessed from the mobile terminal 10, and an RNC 33 having the same function as the RNC 23 used in the WCDMA wireless system. The wireless LAN system 40 includes access points 41-43 accessed from the mobile terminal 10. Similarly, the next-generation wireless system 50 includes access points 51-53 accessed from the mobile terminal 10.

The IP network 100 includes a service support platform (SSPF) 110 comprising a group of service control/execution functions, a network control platform (NCPF) 120 comprising a group of network control/execution functions, such as network router control or QoS control, and an IP backbone (IP-BB) 130 comprising a group of IP packet transmission functions. The IP backbone 130 includes access routers 131-138. In this example, access router 134 is connected to the access points 21 and 22 of the WCDMA wireless system 20. Access router 135 is connected to access points 31 and 32 of the HSDPA wireless system 30. Access router 136 is connected to the access points 41-43 of the wireless LAN 40, and access router 138 is connected to the access points 51-53 of the next-generation wireless system 50. Access router 137 is connected to the access points 43 and 53 across different wireless systems 40 and 50. In this manner, heterogeneous wireless systems 20, 30, 40, and 50 are accommodated in a common IP backbone 130.

The network control platform (NCPF) 120 controls the IP backbone 130. The NCPF 120 includes a routing manager 121 for performing routing control, a QoS manager 122 for performing QoS control, a security manager 123 for performing security control, and a session manager 124 for carrying out session control. In the NCPF 120, a network controller 125 communicates with each of the managers 121-124, and controls the operations of these managers.

The managers 121-124 are called functional entities, which are network devices for managing routing, QoS, security, and session, respectively. Further functional entities may be added to the NCPF 120 according to increase or modification of services. The service support platform (SSPF) 110 supports application control.

Figure 2:
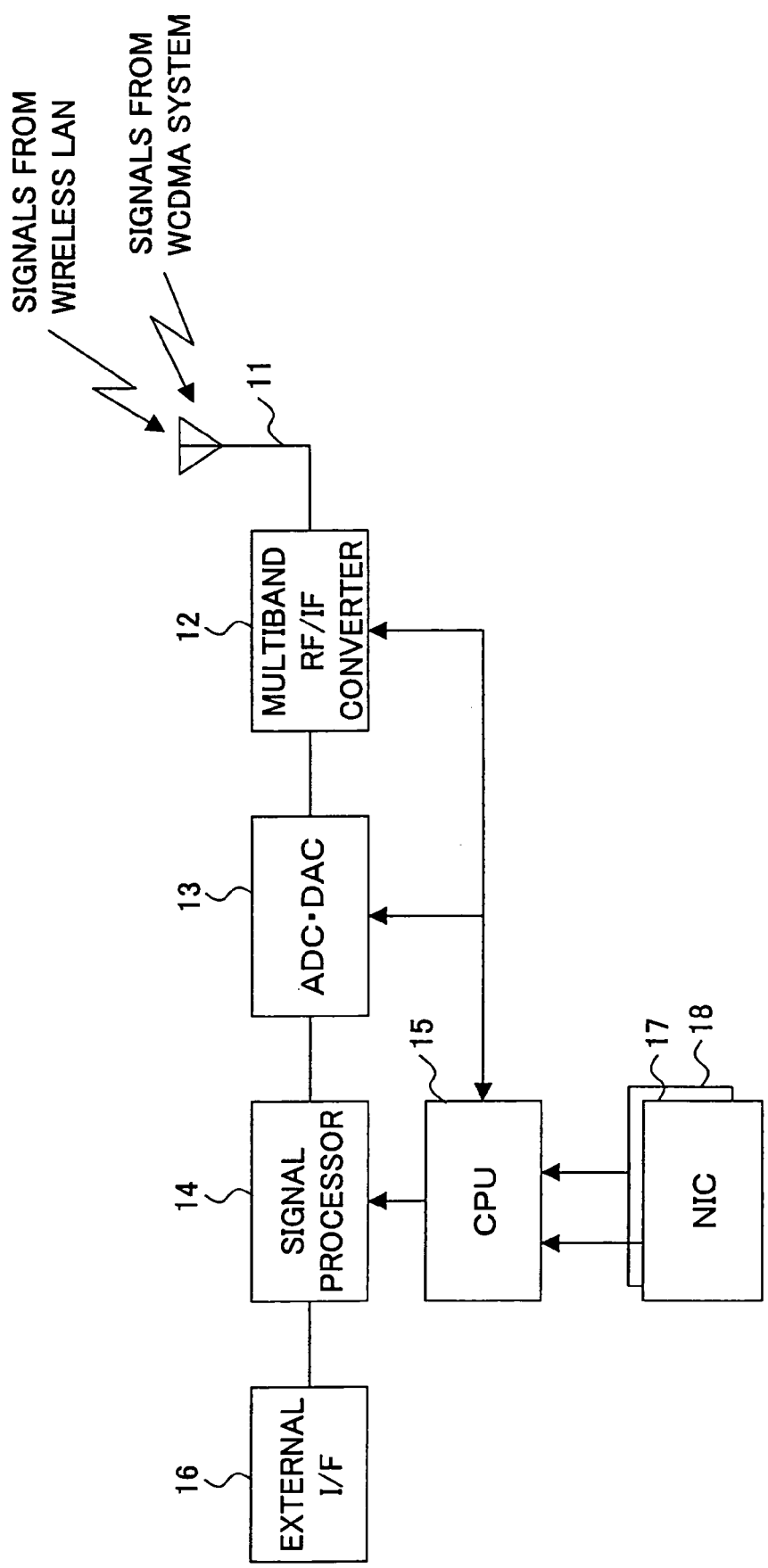
FIG. 2 is a block diagram of the mobile terminal used in the network control system shown in FIG. 1.

FIG. 2 illustrates the structure of the mobile terminal 10 shown in FIG. 1. To simplify the explanation, the mobile terminal 10 shown in FIG. 2 is capable of communicating based on WCDMA and wireless LAN.

The mobile terminal 10 has an antenna 11 that receives wireless signals from a WCDMA system and a wireless LAN. A multiband RF/IF converter 12 switches filters according to wireless schemes of the received signals and converts the radio signals to IF signals. A combination of an analog-to-digital converter (ADC) and a digital-to-analog converter (DAC) 13 carries out signal conversion of the IF signals between the analog format and the digital format. A signal processor 14 converts digital IF signals to baseband signals and carries out appropriate signal processing (such as despreading and modulation/demodulation) in accordance with the associated wireless scheme. An external I/F 16 outputs the processed signals from the signal processor 14 to an Ethernet (registered trademark) port, for example. A CPU 15 controls the overall operation of the system. The CPU 15 determines the wireless system to which the mobile terminal 10 is going to shift, based on the received signal supplied from the multiband RF/IF converter 12, and reports the determination result to the IP network 100. The mobile terminal 10 is furnished with network interface cards (NIC) 17 and 18 applicable to WCDMA and wireless LAN.

The CPU 15 has a radio resource managing function, and collects radio resource information representing the conditions of wireless communications with multiple access points, which is acquired via the multiband RF/IF converter 12. Then, the CPU 15 determines a candidate access point of a wireless system to which the mobile terminal 10 is going to move, based on the collected information, for controlling handover. The radio resource information includes a received power level, a bit error rate, channel information, and QoS information, which represent signal receiving quality of the downlink of each access point. The information about the candidate access point determined by the CPU 15 is transmitted via the multiband RF/IF converter 12 to the current access point with which the mobile terminal 10 is in communication. Then, this information is forwarded to the IP network 100.

The mobile terminal 10 may be a software-defined radio. In this case, the mobile terminal 10 functions as a terminal device that operates under a desired wireless communication scheme by downloading software of a specific wireless communication scheme stored in the network interface card (NIC) 17 or 18 to the multiband RF/IF converter 12, the ADC/DAC 13, and the signal processor 14. Different types of wireless communication software may be stored in a single NIC, or alternatively, each network interface card may be assigned to a single type of wireless communication software. In this embodiment, the network interface card (NIC) 17 stores wireless communication software corresponding to wireless LAN, and NIC 18 stores wireless communication software corresponding to WCDMA.

Although, in the example shown in FIG. 2, the antenna 11 is a component separate from the network interface card (NIC), the antenna may be contained in the NIC. In this case, the NIC antenna performs the same function as the separate antenna 11.

Next, the basic operation of the network control system is explained with reference to FIG. 3.

Figure 3:
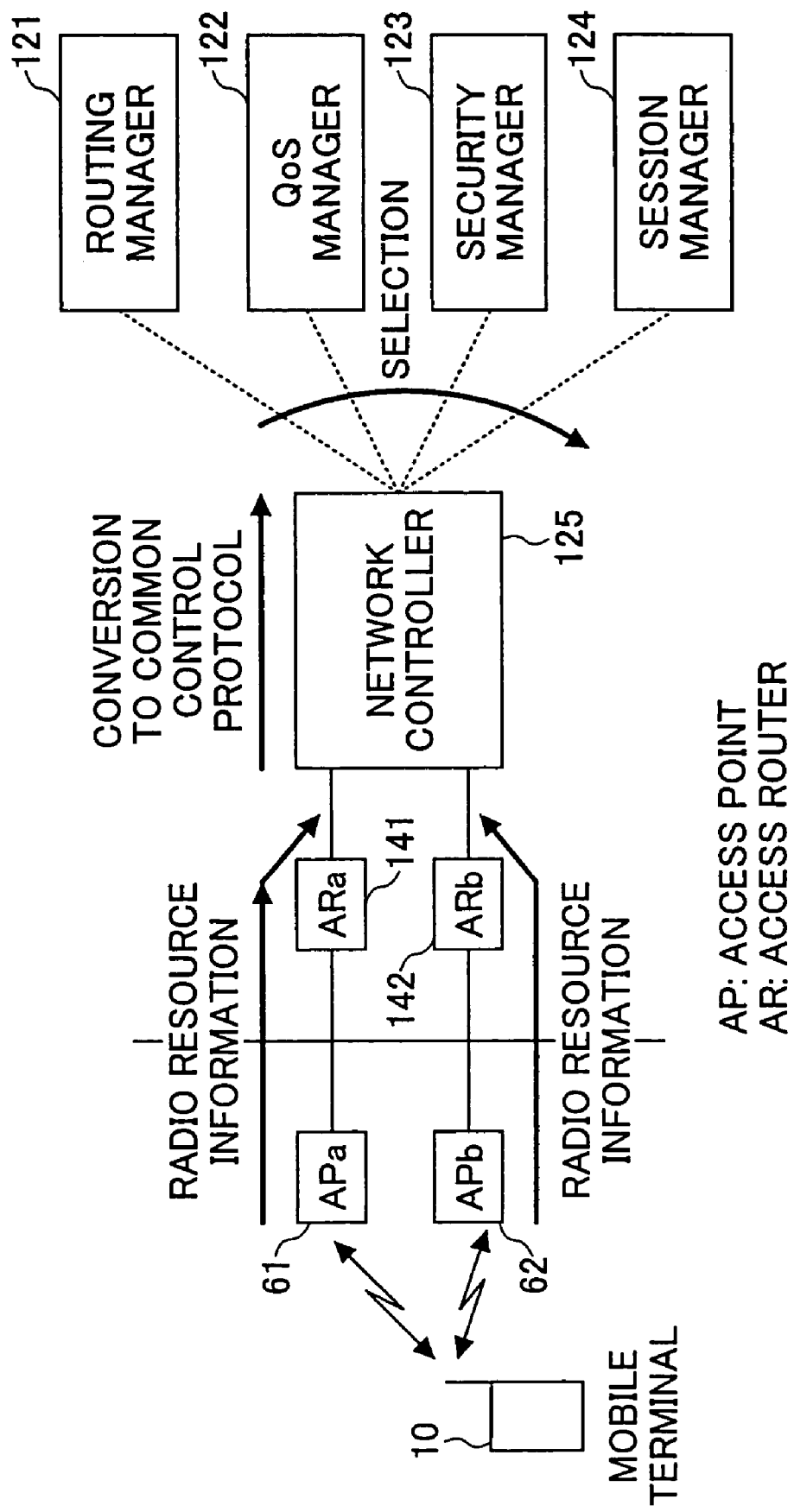
FIG. 3 is a schematic diagram for explaining the operation of the network control system according to an embodiment of the invention.

In FIG. 3, the mobile terminal 10 is currently communicating with access point (APa) 61 and access point (APb) 62 belonging to heterogeneous wireless systems. The mobile terminal 10 collects information representing the signal received quality of downlink signals transmitted from each of the access points 61 and 62, as radio resource information, during the communications with the access points 61 and 62. The mobile terminal determines a candidate access point to be accessed at a new location. For example, either access point (APa) 61 or access point (APb) 62 having a higher power level of received signal may be selected as the candidate access point.

Upon determination of the candidate access point, the mobile terminal 10 transmits a control signal containing the determination result (indicating the candidate access point) and the radio resource information to the network controller 125 of the IP network 100. The network controller 125 extracts the candidate access point and the radio resource information from the control signal, and carries out format conversion on the extracted information according to a prescribed rule, in order to convert the information to a common format independent of each of the wireless systems. The value contained in the format-converted information extracted from the control signal (e.g., the format-converted radio resource information) is further converted to another value according to the prescribed rule. The network controller 125 then selects an appropriate manager from among the managers on the NCPF 120 according to the prescribed rule, and transmits the converted control signal to the selected manager. In this example, the network controller 125 detects the necessity of handover control from the information contained in the control signal. Accordingly, the network controller 125 selects the routing manager 121 as the optimum manager to establish a new route (including allocation of routing address corresponding to the new route) for the mobile terminal 10. Then, the routing manager 121 transmits routing information to appropriate routers to establish the optimum route for the mobile terminal 10 at the new location.

Depending on the target information (such as the access point address, the access router address, the wireless QoS parameter corresponding to the required QoS class, the type of wireless system, or information representing the status of wireless quality) contained in the control signal, the prescribed rule may include, for example:

(1) Determining as a protocol (nonvolatile);
(2) Depending on a local condition, such as the network configuration (physical configuration); or
(3) Setting differently for each user to be controlled and in the time-limited manner (volatile).

Figure 4:
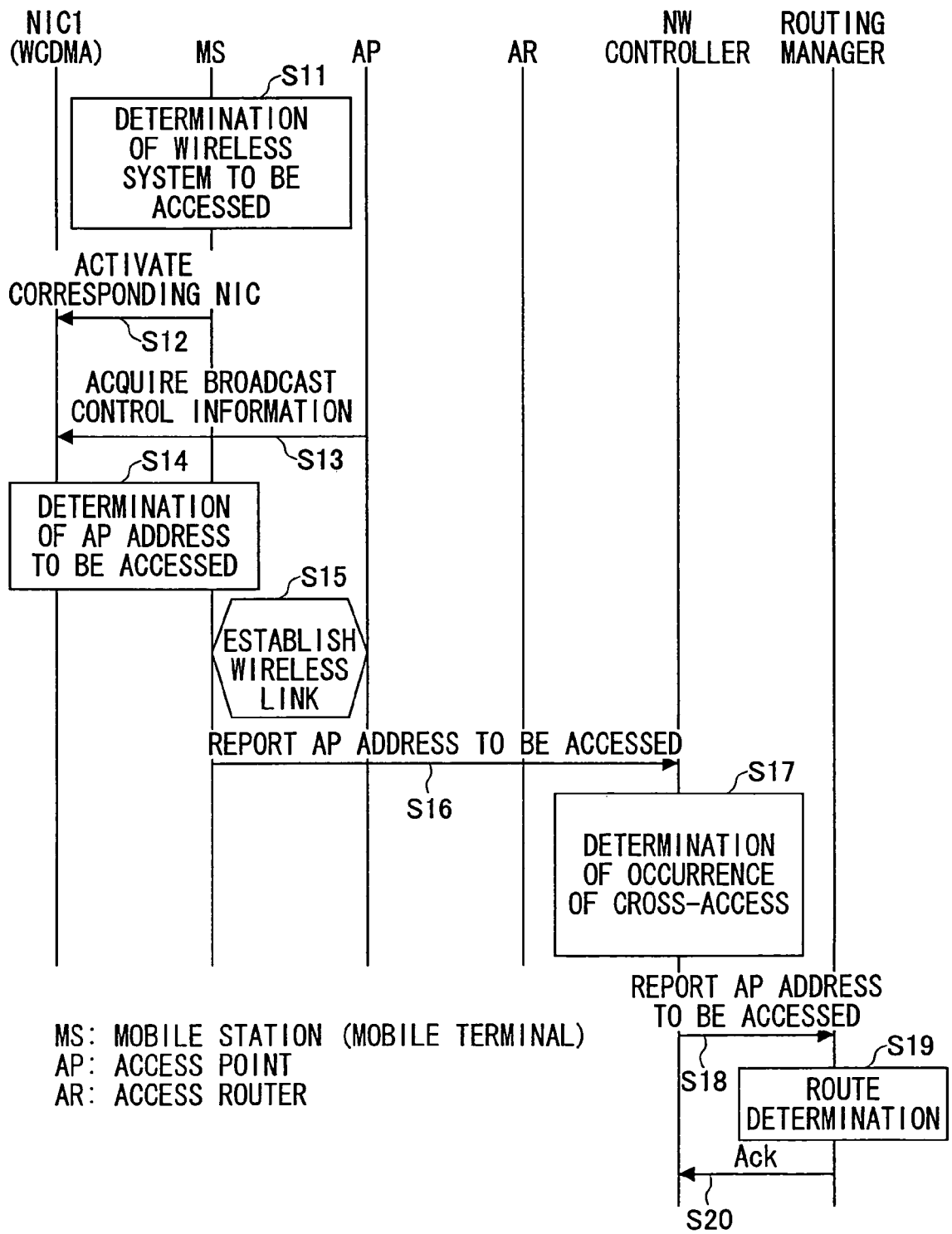
FIG. 4 is a sequence diagram of the operation carried out in the network control system to set the optimum route for the mobile terminal during wireless communication.

FIG. 4 shows a sequence carried out in the network control system when the routing manager is selected as the optimum manager and the optimum route is established for the mobile terminal 10, which is in communication with the system.

It is presumed that the network controller 125 knows each access point and the associated access router. The relation between each access point and the associated access router is recorded in an AP-AR management table, which is explained below in more detail. In the sequence diagram shown in FIG. 4, MS denotes the mobile terminal 10, AP denotes access point, and AR denotes access router.

The mobile terminal (MS) 10 is monitoring the downlink signal from each of the access points. When the level of the received signal from a certain access point exceeds a threshold, the mobile terminal selects a wireless system accommodating this access point as a candidate wireless system in a new location (S11). Then, the mobile terminal 10 activates the network interface card (NIC) corresponding to the candidate wireless system (S12) to acquire broadcast information transmitted from the candidate access point (S13). In this example, NIC1 corresponding to WCDMA is activated. The mobile station 10 determines the address of the candidate access point from the broadcast information transmitted from the access point (S14). Then, a wireless link is established between the mobile terminal 10 and the candidate access point (S15). The mobile terminal 10 reports the address of the candidate access point to the network controller 125 (S16).

The network controller 125 refers to the AP-AR management table that records the relation between each access point and the associated access router, and determines whether cross-access between the current access router and the candidate access router is occurring (S17). If cross-access is occurring, the network controller 125 reports the address of the candidate access router of the new location to the routing manager (S18).

Figure 5:
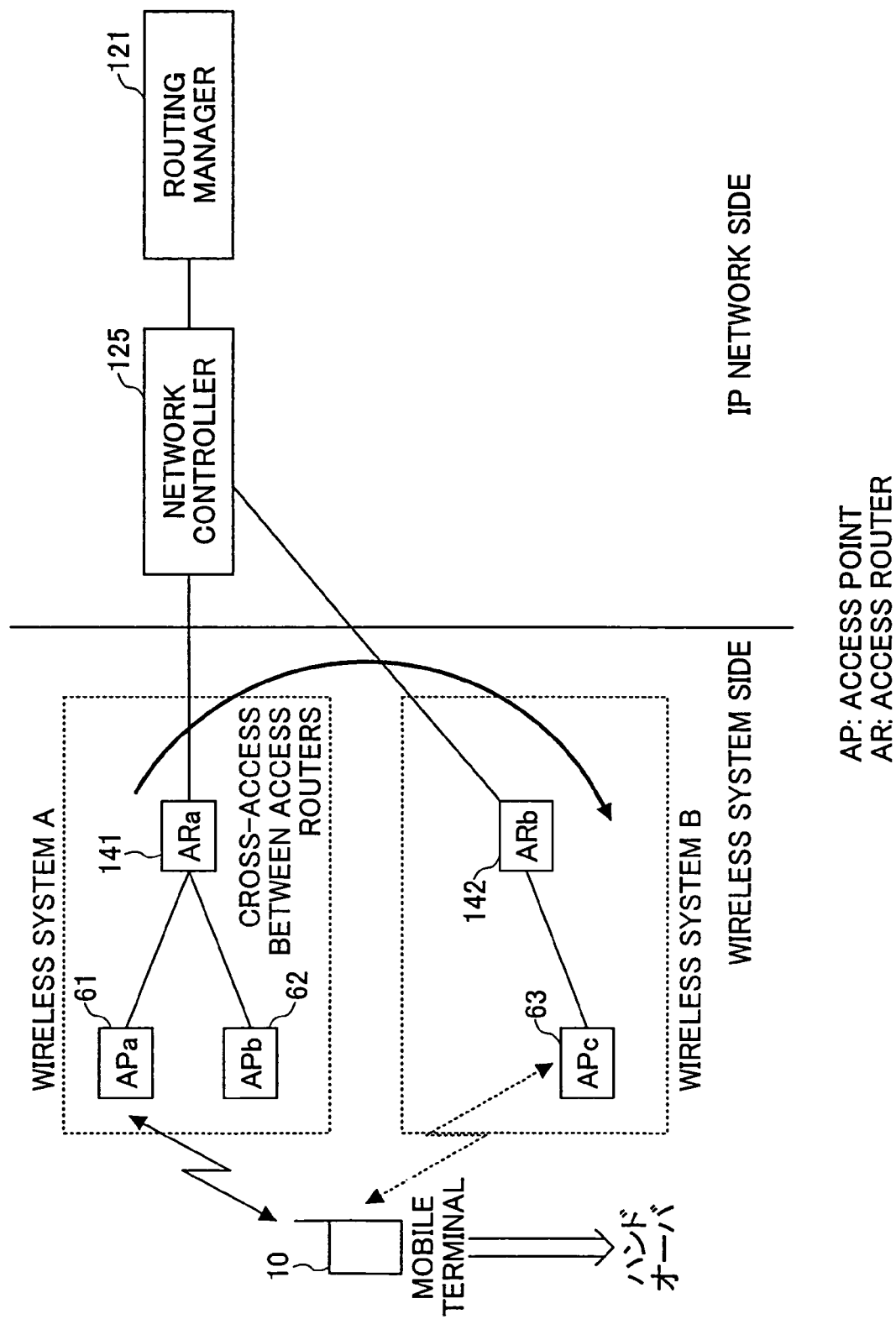
FIG. 5 is a schematic diagram for explaining cross-access between the current access router and a new access router.

FIG. 5 is a schematic diagram used to explain cross-access between the current access router and the candidate access router. In FIG. 5, the mobile terminal moves into the service zone of the access point (APc) 63 of the wireless system B during communications with the current access point (APa) 61. The mobile terminal MS 10 monitors downlink signals transmitted from APa 61 and APc 63. When the receiving power level of the signal from the access point APc 63 exceeds the prescribed threshold, then the mobile terminal MS 10 selects this access point APc 63 as a candidate of the new access point to which the mobile terminal is approaching. The mobile terminal MS 10 extracts the address of the candidate access point APc 63 from the received signal, and reports this address to the network controller 125 via the currently communicating access point APa 61 and the associated access router ARa 141. Upon receiving the address of the candidate access point APc 63 from the mobile terminal MS 10, the network controller 125 refers to the AP-AR management table.

FIG. 6 is an example of the AP-AR management table, which records the current access point (AP address) and the associated access router (AR address) for each user, together with the wireless QoS parameter corresponding to the required QoS class, type of wireless system, and the state of wireless quality.

In this example, the user A of the mobile terminal MS 10 is currently communicating with APa 61, and the user packets are transmitted to the upper layer node via the ARa 141. Accordingly, the address of the APa 61 is registered as the AP address of user A in the AP-AR management table. Similarly, the address of the ARa 63 is registered as the AR address of user A in the AP-AR management table.

When the network controller 125 receives the address of the candidate access point APc 63 from the mobile terminal MS 10, the network controller 125 searches for the AR address corresponding to the address of the access point APc 63 in the AP-AR management table. In this example, the AR address corresponding to the access point APa 63 is ARb 142. From the AP-AR table, this access router ARb 142 is currently used to transmit user packets from user X.

Upon finding the address of the candidate access router, the network controller 125 determines whether cross-access is occurring between the new access router ARb 142 and the current access router ARa 141.

There are two methods for determination of occurrence of cross-access.

The first method is one corresponding to determination of handover between heterogeneous wireless systems, and for determining occurrence of cross-access based on the information about the types of the wireless systems. In the example shown in FIG. 5, the types of the wireless systems to which the access routers ARa 141 and ARb 142 belong, respectively, are compared to each other. If the types of these wireless systems are different from each other, it is determined that cross-access is going on.

The second method is one corresponding to determination of handover between homogeneous wireless systems, and for determining occurrence of cross-access based on comparison between the prefixes assigned to the respective access routers.

Returning to FIG. 4, after the determination of occurrence of cross-access, the determination result and the address of the candidate access point are reported to the routing manager 121 (S18). The routing manager 121 sets up the optimum route for the mobile terminal based on the address information of the new access router (S19). The optimum route setting is performed by, for example, moving the anchor point to dynamically look for and update the optimum route. Once the optimum route is set up, acknowledge (ACK) of completion of optimum route setting is sent to the network controller 125 (S20).

In this manner, when the network controller 125 detects occurrence of cross-access between the current access router and the new access router, the address of the new candidate access point to which the mobile terminal 10 is approaching is reported to the routing manager 121. The routing manager 121 carries out optimum route setting based on the address information of the new access point. The process of setting the optimum route includes updating of the routing cache table of the new access router ARb 142.

Figure 7:
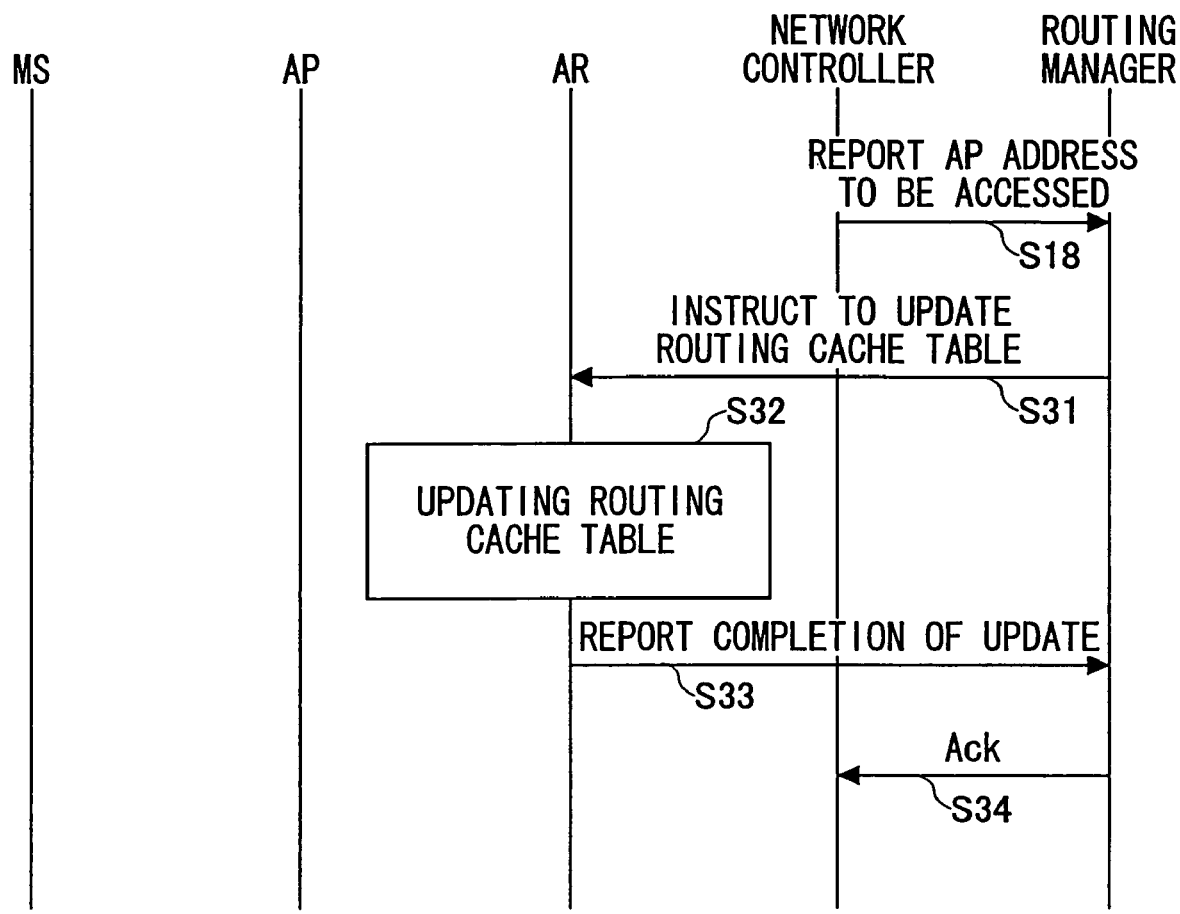
FIG. 7 is a sequence diagram of the operation carried out in the network control system to update the routing cache table.

FIG. 7 is a sequence diagram for updating the routing cache table. Upon receiving the address information of the new access point from the network controller 125 (S18), the routing manager 121 transmits an instruction for updating the routing cache table to the new access router ARb 142 (S31). The routing cache table is cached (or temporarily stored) in the access router ARb 142, and the contents of the routing cache table are updated by the ARb 142 (S32). When the routing cache table has been updated, ARb 142 reports the completion of table update to the routing manger 121 (S33). Finally, acknowledgement of completion of the process is transmitted from the routing manager 121 to the network controller 125 (S34).

Figure 8:
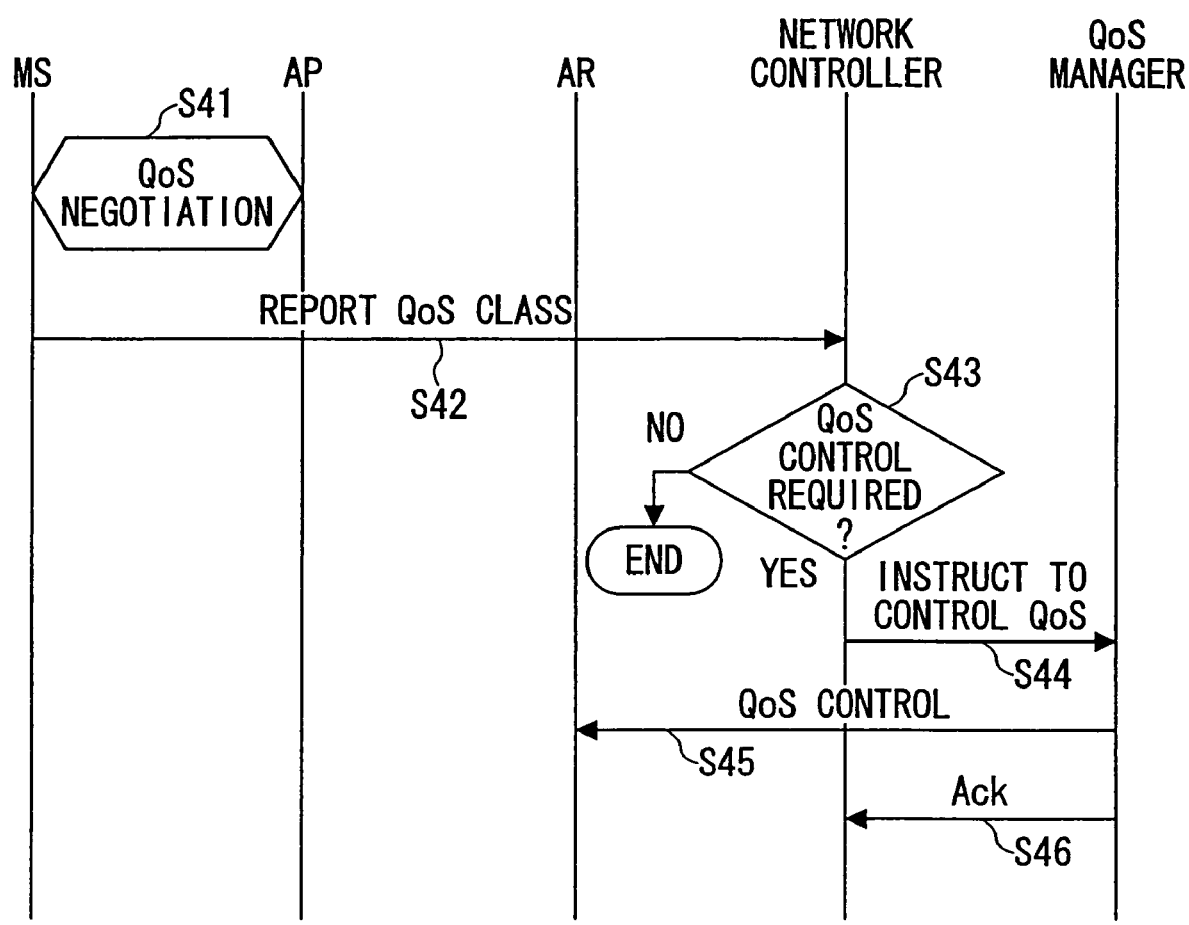
FIG. 8 is a sequence diagram of QoS negotiation carried out between the mobile terminal and an access point at the beginning of communications.

FIG. 8 is a sequence diagram carried out when the QoS manager 122 is selected as the optimum manager by the network controller 125. In this case, QoS negotiation is conducted between the mobile terminal and an access point. In the example shown in FIG. 8, QoS negotiation is carried out at the beginning of communications. In FIG. 8, symbol MS denotes the mobile terminal 10, AP denotes access point, and AR denotes access router.

When the mobile terminal MS 10 starts wireless communications, a service class is determined for each of desired applications. In order to guarantee the quality of service corresponding to the selected service class, QoS negotiation is conducted between the mobile terminal MS 10 and the access point AP (S41). For the negotiation, the information representing the service class of each of the selected applications is converted to QoS class. Accordingly, the QoS class information is used in the QoS negotiation.

When the QoS negotiation is finished, the mobile terminal MS 10 reports the QoS class to the network controller 125 of the IP network 100 (S42).

Upon receiving the QoS class information from the mobile terminal MS 10, the network controller 125 determines whether QoS control is required, based on the priority information contained in the QOS class information (S43). When a lower-priority QOS class, such as a Best-Effort type QoS, is received, the network controller 125 determines that QoS control is not required (NO in S43), and no instruction for QoS control is transmitted to the QoS manager 122. On the other hand, when a higher-priority QoS class, such as Bandwidth Guarantee, is received, the network controller 125 determines that QoS control is required (YES in S43), and reports the received QoS class to the QoS manager 122 (S44). The QoS manager 122 converts the QoS class received from the network controller 125 to a QoS parameter, and performs QoS control on the access router AR based on the QoS parameter (S45). Then, the QoS manager 122 transmits acknowledgement (ACK) of completion of QoS control to the network controller 125 (S46).

QoS negotiation is conducted not only at the beginning of communications, but also during communications.

Figure 9:
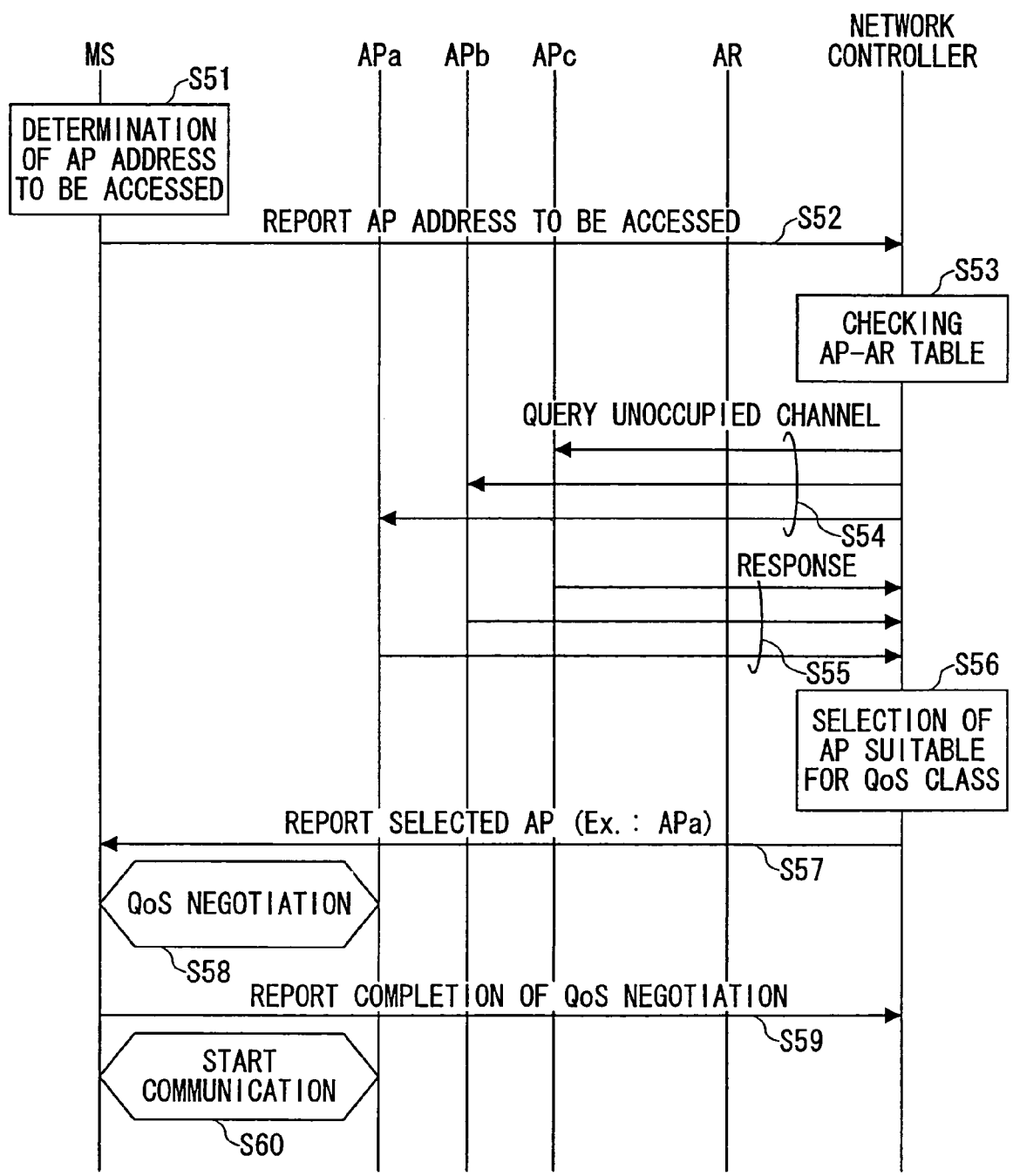
FIG. 9 is a sequence diagram of QoS negotiation carried out between the mobile terminal and a new access point when the mobile terminal moves to a different wireless system during communications.

FIG. 9 is a sequence diagram of QoS negotiation conducted between the mobile terminal 10 and an access point during communications. In the example shown in FIG. 9, it is assumed that the network controller 125 maintains the QoS class from the beginning to the end of the communications, and has the AP-AR management table shown in FIG. 6. In FIG. 9, symbol MS denotes mobile terminal 10, APa through APc denote access points, and AR denotes access router.

When the receiving power level of a signal transmitted from a certain access point (AP) exceeds the threshold, the mobile terminal MS 10 selects that access point as a candidate access point (S51), and reports the address of the candidate access point to the network controller 125 provided on the IP network 100 (S52).

The network controller 125 refers to the AP-AR management table shown in FIG. 6 (S53), and finds access points located at or near the candidate access point. Then, the network controller 125 inquires of these nearby access points (in this example, access points APa, APb, and APc) whether there is an unoccupied wireless channel (S54).

Upon receiving information about unoccupied wireless channels from the nearby access points APa, APb, and APc (S55), the network controller 125 selects an access point suitable for the QoS class based on the received channel information (S56), and reports the address of the selected access point to the mobile terminal MS 10 (S57).

The mobile terminal MS 10 starts QoS negotiation with the designated access point (S58), and reports completion of QoS negotiation to the network controller 125 when the QoS negotiation is finished (S59). Then, the mobile terminal MS 10 starts communications with this access point (S60).

According to the embodiments shown in FIG. 8 and FIG. 9, the network controller 125 selects an access point suitable for the previously required QoS in order to appropriately control the QoS manager. Consequently, Quality of Service (QoS) is correctly handed over during intersystem handover.

With the above-described embodiment, the control signal transmitted form the mobile terminal 10 is analyzed and converted to a common format that is independent of wireless systems. In the embodiment, the control signal includes radio resource information, such as QoS information or information required for handover. A protocol based on this common format (which is referred to as the "common control format") is used to assign the control signal to an appropriate functional entity (i.e., an appropriate manager provided on the NCPF). In other words, the network controller 125 absorbs differences in communication protocol, application, data format, data expression, and attribute, and functions as a coordinator or an agent to integrate heterogeneous systems. Consequently, differences in wireless systems are concealed from the functional entities on the NCPF 120.

With this arrangement, a new wireless system can be accommodated in the common IP network, without changing the spec of each of the functional entities or adding an interface with respect to each of the wireless systems. Since compatibility of the control signal among heterogeneous wireless systems can be guaranteed, rational network management can be realized.

In addition, even if the network control performance or the wireless access technique is improved after accommodation of various wireless systems in the network, influence due to such improvement can be concealed from the other functional entities and wireless systems.

In the embodiment, the routing manager 121 functions as the mobile control entity. However, a location manager for managing the location information of the mobile terminal 10 may be combined with the routing manager 121 to realize the mobile control entity. Location management is a function of grasping the location information of the mobile terminal that is out of communication on the network, calling this mobile terminal based on the location information, and returning the mobile terminal to the communicating state.

To implement this, the network controller 125 is furnished with a table for converting a paging request to a paging address corresponding to each of the wireless systems when the paging request occurs. When the network controller 125 receives a paging request to a mobile terminal that is currently visiting a wireless system A, it refers to the conversion table and converts this paging request to the paging format for the wireless system A. Then, the network controller 125 transmits this paging format to the location manager. The location manager transmits a paging signal to the access point of the wireless system A in which the mobile terminal is currently located.

By combining routing management and location management for mobile control, management of user location information and route optimization are performed in a rational manner.

In the above-described embodiment, the network controller 125 controls the routing manager 121 and the QoS manager 122 on the NCPF 120. However, the present invention is also applicable to control for the security manager 123 and the session manager 124. In addition, the present invention is applicable to control of arbitrary managers, such as a authentication manager, a charging manager, a link-establishing manager, a maintaining/monitoring manager, a service control manger, a network control manager, or a location registration manager, other than these managers illustrated on the NCPF 120 in FIG. 1. Furthermore, a user preference management database or an upper layer application can also be controlled by the network controller. An example in which the network control of the present invention is applied to a location registration manager and a user preference management database is described below.

Figure 10:
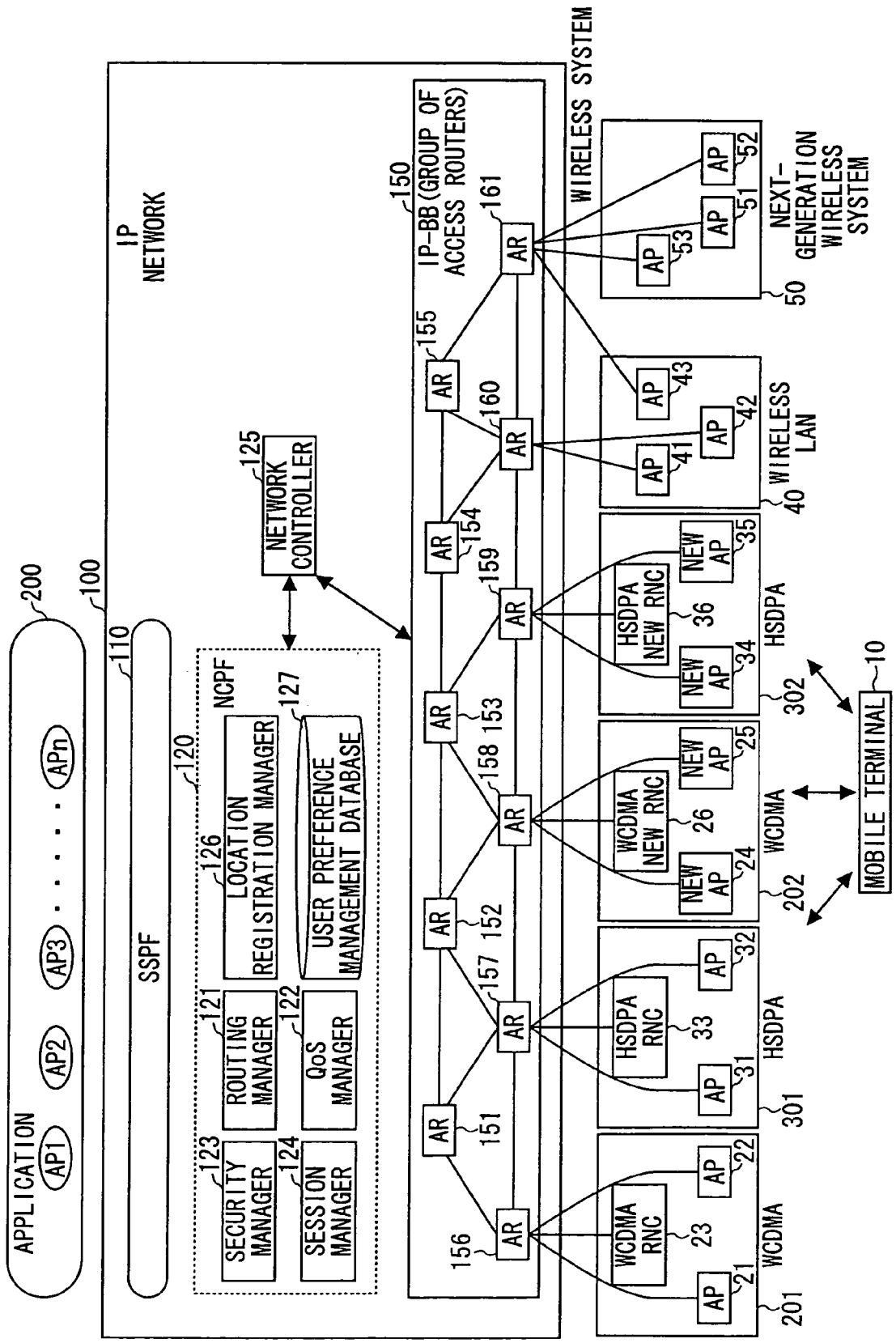
FIG. 10 is a schematic diagram of an example of the system structure of the network control system, which further includes a location registration manager and a user preference management database according to another embodiment of the invention.

FIG. 10 illustrates the overall structure of the network control system in which a location registration manager and a user preference management database are incorporated, according to the second embodiment of the invention. The same elements as those shown in FIG. 1 are denoted by the same symbols or numerical references. The network control system includes an existing WCDMA system $20_1$, an existing HSDPA system $30_1$, a newly added WCDMA system $20_2$, and a newly added existing HSDPA system $30_2$. A location registration manager 126 and a user preference management database 127 are provided on the NCPF 120 of the IP network 100.

The location registration manager 126 has a function of collectively managing location registration of the user (mobile) terminal 10 using a common location registration ID among the respective wireless systems. The location registration manger 126 also has a function of deleting the location registration managing function of a newly added wireless system. Such a newly added system includes a wireless system that is being newly established, or will be developed in the future. The location registration managing function of such a new system is, for example, a function of the radio network controller (RNC) used in a WCDMA wireless system.

The user preference management database 127 stores and manages user subscription information of the mobile terminal 10 together with the contracted wireless scheme.

The network controller 125 converts the location registration ID contained in a location registration request into a common location registration ID, and assigns the location registration request having the common location registration ID to the location registration manager 126.

By making use of the location registration manger 126 and the user preference management database 127, the network controller 125 implements location registration management on the IP network 100 for the mobile terminal 10.

Figure 11:
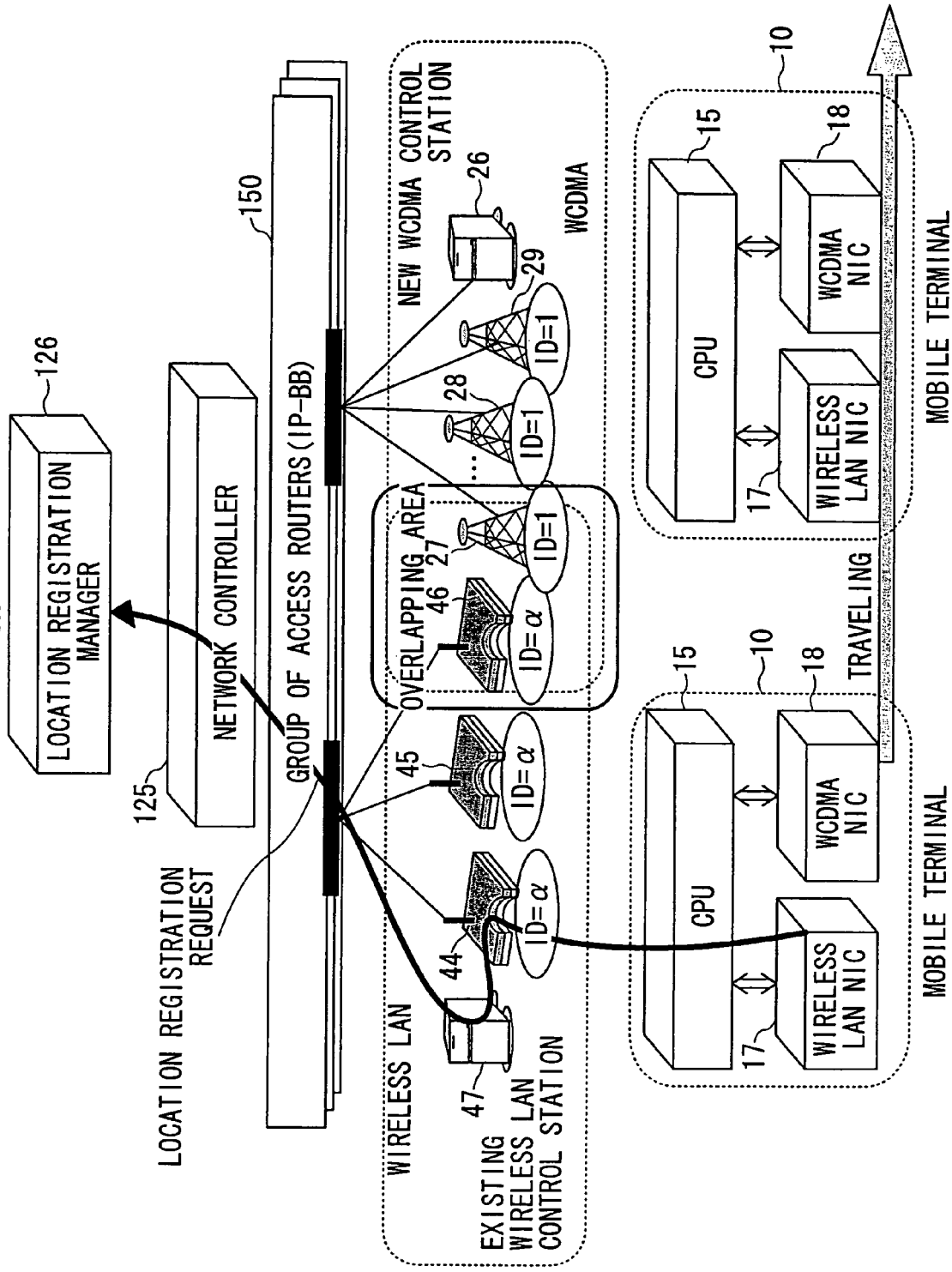
FIG. 11 is a schematic diagram for explaining location registration performed when the mobile terminal moves from an existing wireless LAN system to a new WCDMA system.

FIG. 11 is a schematic diagram for explaining the location registration procedure implemented when the mobile terminal 10 moves from an existing wireless LAN system to a newly added WCDMA system. The bold line indicates the signal flow of a location registration request.

A location registration ID is given to the wireless zone (or cell) of each of the access points AP 44-46 of the existing wireless LAN system. In the figure, the location registration ID=α is given to each of AP 44-46. Similarly, a location registration ID is given to the wireless zone defined by each of the access points (corresponding to wireless base stations) AP 27-29 of the newly added WCDMA system. In this example, the location ID=1 is given to each of AP 27-29. Each of the wireless LAN system and the WCDMA system includes a radio network controller (RNC), which functions as a location registration manager and a radio resource manager (RRM). The radio network controller (RNC) is referred to as a control station in this example.

As illustrated in FIG. 11, the wireless zone formed by access point AP 46 of the existing wireless LAN system and the wireless zone formed by the access point AP 27 of the new WCDMA system overlap each other. If the mobile terminal 10 is located in the overlapping area, the mobile terminal 10 is capable of communicating with both access points AP 26 and 27 of the wireless LAN system and the WCDMA system, by switching over the wireless communication schemes. The wireless communication schemes are switched by the CPU 15 of the mobile terminal 10, which acquires necessary wireless parameters from the wireless LAN network interface card (NIC) 17 or the WCDMA network interface card (NIC) 18, and appropriately sets the parameters for RF, modulation scheme, and baseband signal processing.

Figure 12:
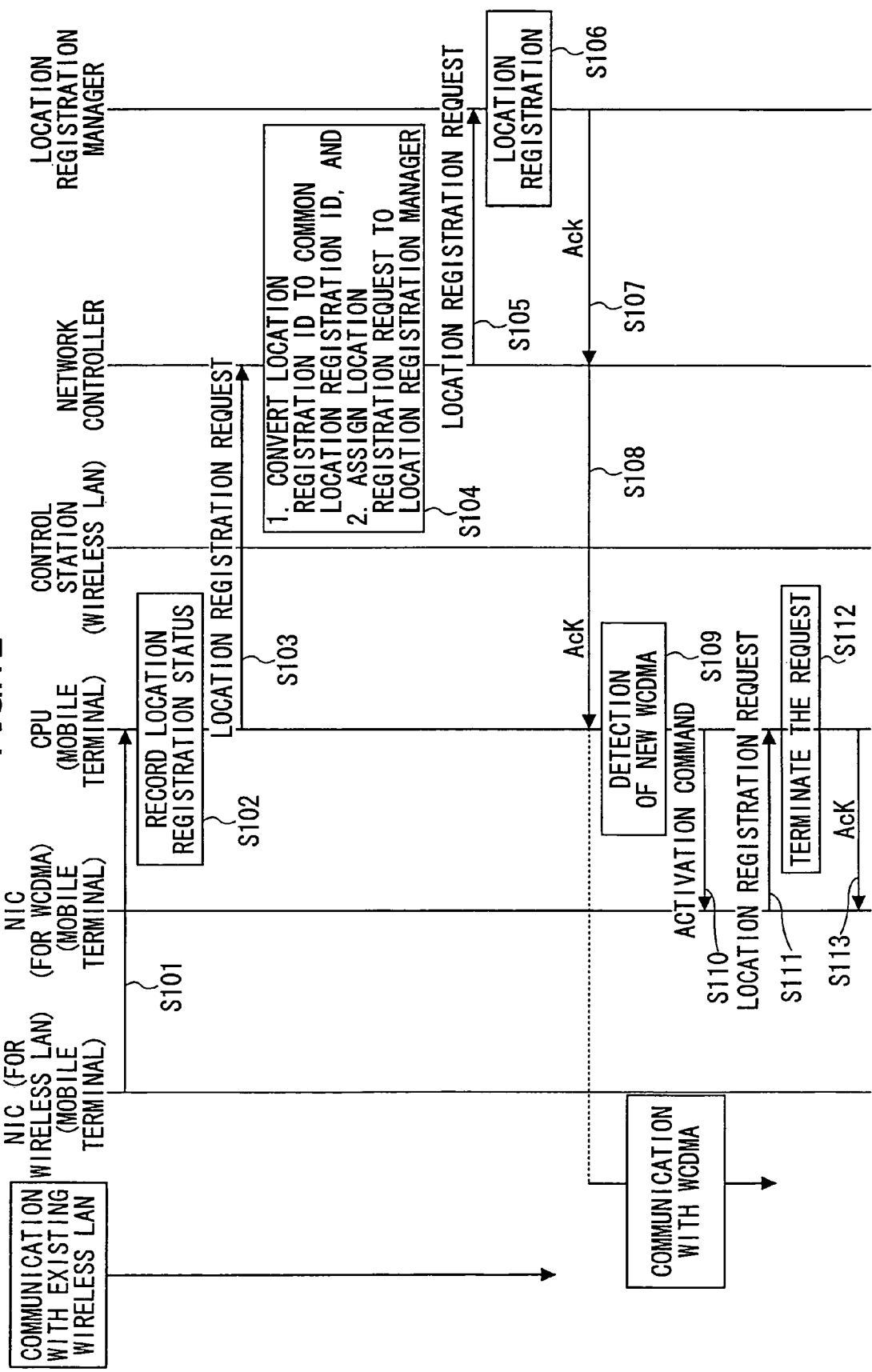
FIG. 12 is a sequence diagram of the operation carried out in the network control system when the mobile terminal moves from an existing wireless LAN system to a new WCDMA system.

FIG. 12 is a sequence diagram of the location registration procedure according to the second embodiment of the invention, which is conducted when the mobile terminal 10 moves from the existing wireless LAN system to a new WCDMA system.

When the mobile terminal 10 starts communicating with the existing wireless LAN system, the NIC 17 of the mobile terminal 10 produces a location registration request and supplies this request to the CPU 15 (S101). Upon receiving the location registration request, the CPU 15 records the status of location registration of the mobile terminal 10 with respect to the existing wireless LAN system in the memory (S102), and transmits the location registration request to the network controller 125 via the control station 47 of the existing wireless LAN system (S103). The network controller 125 extracts the location registration ID peculiar to this wireless LAN system from the location registration request received from the control station 47 of the existing wireless LAN system, and converts this peculiar location registration ID to a common location registration ID managed by the location registration manager 126 (S104).

The location registration manager 126 possesses and manages a management table shown in FIG. 13, in which a common location registration ID independent of wireless communication scheme is recorded for each of the wireless communication systems. The network controller 125 possesses and manages another management table shown in FIG. 14, in which the common location registration ID is stored in association with each of the location registration IDs peculiar to each of the wireless communication schemes.

If the existing wireless LAN system employs wireless communication scheme A, then the network controller 125 converts location registration ID=α to the common location registration ID=1. After the conversion of the location registration, the network controller 125 selects the location registration manager 126 (S104), and transmits the location registration request to the location registration manager 126 (S105).

Based on the location registration request transmitted from the network controller 125, the location registration manager 126 implements location registration for the mobile terminal 10 (S106), and transmits acknowledgement (ACK) to the mobile terminal 10 via the network controller 125 (S107, S108). The mobile terminal 10 receives the ACK.

When the mobile terminal 10 moves from the service area of the wireless LAN system to a service area of the WCDMA system, the CPU 15 detects the entering (S109), and supplies an activation command to the WCDMA network interface card 18 (S110). In response to the activation command, the WCDMA network interface card 18 produces a location registration request for enabling communication in the WCDMA mode, and outputs the location registration request to the CPU 15 (S111). Upon receiving the location registration request, the CPU 15 refers to the information of location registration status stored in the memory to confirm whether location registration has already been completed. In this example, location registration is accomplished when the mobile terminal starts communications with the existing wireless LAN system. Accordingly, the CPU 15 does not transmit the newly received location registration request to the IP network, and instead, terminates this location registration request (S112). Then, the CPU 15 returns a pseudo acknowledgement ACK to the WCDMS network interface card 18 (S113).

In the second embodiment, the network controller 125 converts the location registration ID peculiar to a wireless communication system to a common location registration ID that is common to different types of wireless communication systems accommodated in a network. Since the correspondence between the common location registration ID and the location registration IDs of the respective wireless systems are managed in the network, the mobile terminal does not have to carry out location registration every time the wireless scheme is switched over, even under a heterogeneous wireless communication environment. Because the mobile terminal does not have to transmit a new location registration request for a new wireless communication system, power consumption of the mobile terminal is reduced during the wireless system switching process.

Figure 15:
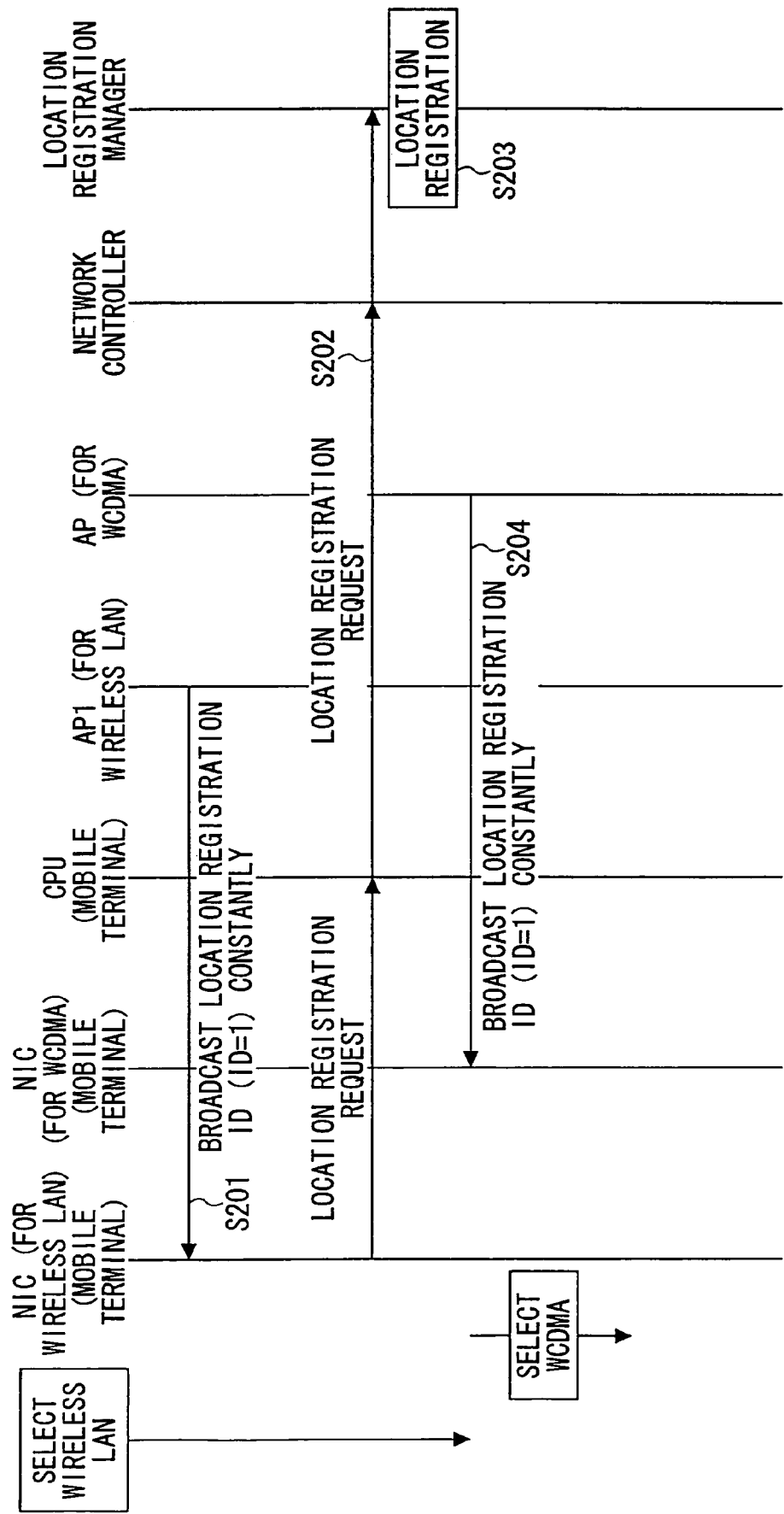
FIG. 15 is a sequence diagram of the operation carried out in the network control system when the mobile terminal moves from a new wireless LAN system to a new WCDMA system.

FIG. 15 is a sequence diagram showing another example of location registration under the heterogeneous wireless communication environment. In FIG. 15, an access point AP1 of the wireless LAN system broadcasts a common location registration ID (ID=1) constantly, and the mobile terminal 10 receives this broadcast signal (S201). Similarly, an access point AP of the WCDMA system broadcasts the common location registration ID (ID=1) constantly. In other words, the common location registration ID (ID=1) is allocated in common to the cell of the access point AP1 of the wireless LAN system and the cell of the access point AP of the WCDMA system.

In this situation, the mobile terminal 10 currently located in the cell of the AP1 of the wireless LAN system transmits a location registration request. The network controller 125 receives the location registration request and supplies this location registration request to the location registration manager 126 (S202). The location registration manager 126 conducts location registration for the mobile terminal 10 (S203).

When the mobile terminal 10 moves from the area of the AP1 of the wireless LAN system to the area of AP of the WCDMA system, the WCDMA network interface card 18 is activated by the CPU 15 of the mobile terminal 10, and it starts monitoring the broadcast signal transmitted from the AP of the WCDMA system, which contains the common location registration ID (S204). In the conventional system in which each wireless communication system broadcasts a different location registration ID, the mobile terminal has to transmit a location registration request every time it receives a new location registration ID from a new wireless communication system. In contrast, with the present embodiment, a common location registration ID is allocated to cells of different wireless communication systems, and therefore, the mobile terminal 10 does not have to transmit a location registration request any longer, once location registration has been completed with respect to the common location registration ID (ID=1). In this manner, allocating a common location registration ID to the cells of different types of wireless systems can prevent location registration process from being repeated every time a wireless scheme is switched. Consequently, power consumption of the mobile terminal 10 is reduced.

In addition, the location registration manager 126 controls and manages location registration of a user terminal in a collective manner for different types of wireless systems. When a new wireless communication system is incorporated in the network, it is unnecessary for the control station (or the repeater station) of the newly added wireless communication system to have a location registration managing function. Consequently, the cost of the control station can be reduced.

This advantage can also be applied to an existing wireless system in the network. For example, when location registration is completed in S106 of FIG. 12, the network controller 125 may transmit an instruction for deleting the location registration managing function to the control station (or the repeater station) of the existing wireless LAN system. The control station deletes the location registration managing program in response to the instruction from the network controller 125. Alternatively, the control station of a wireless communication system may delete the location registration managing function by itself when it receives acknowledgement.

Figure 16:
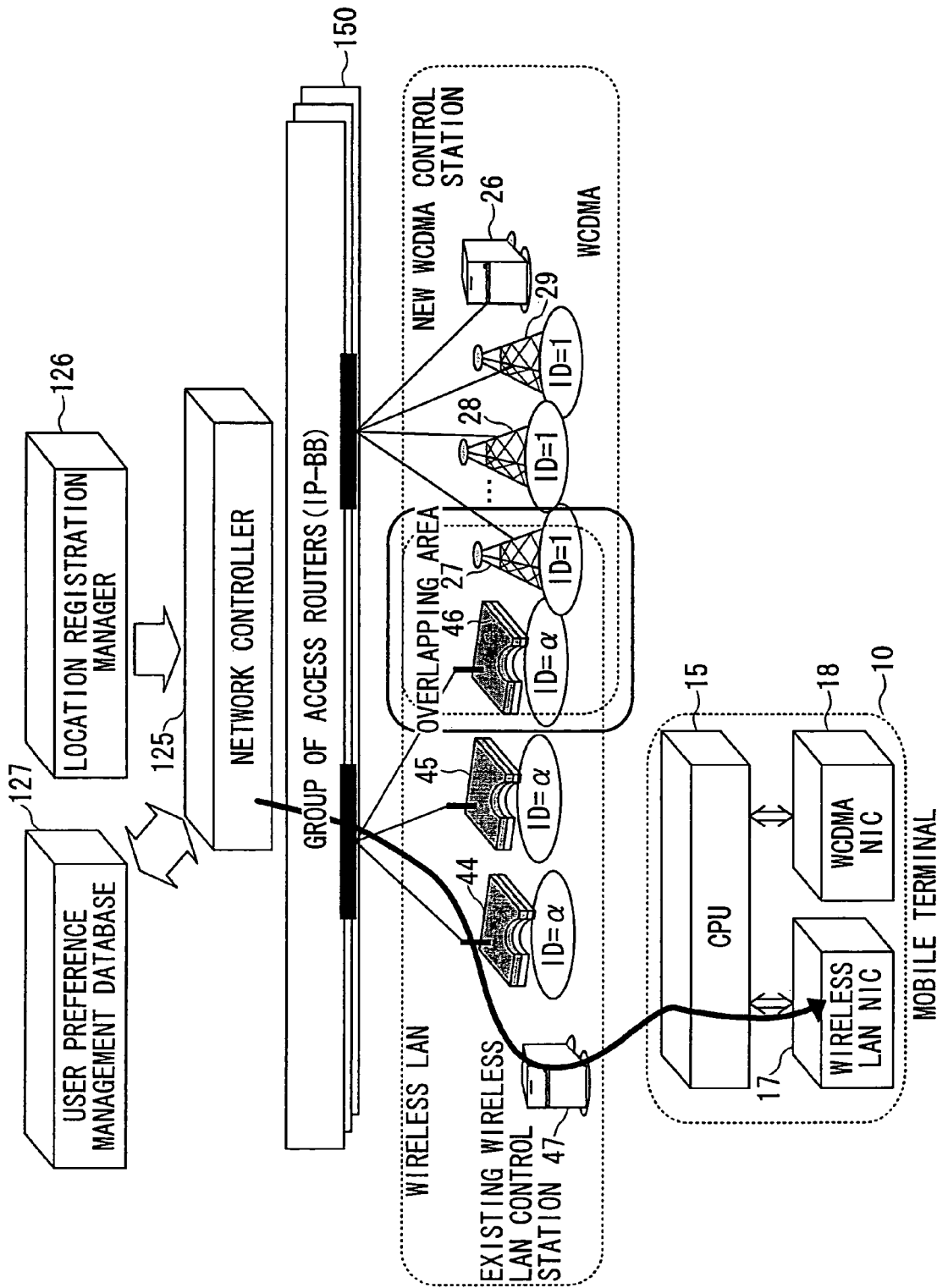
FIG. 16 is a schematic diagram for explaining a paging procedure in an existing wireless LAN system.

Next, a paging procedure carried out in the second embodiment is explained. FIG. 16 is a schematic diagram for explaining the paging procedure for paging the mobile terminal located in an existing wireless LAN system. In FIG. 16, the same elements as those shown in FIG. 11 are denoted by the same symbols or numerical references. The bold line indicates the flow of a paging signal.

Figure 17:
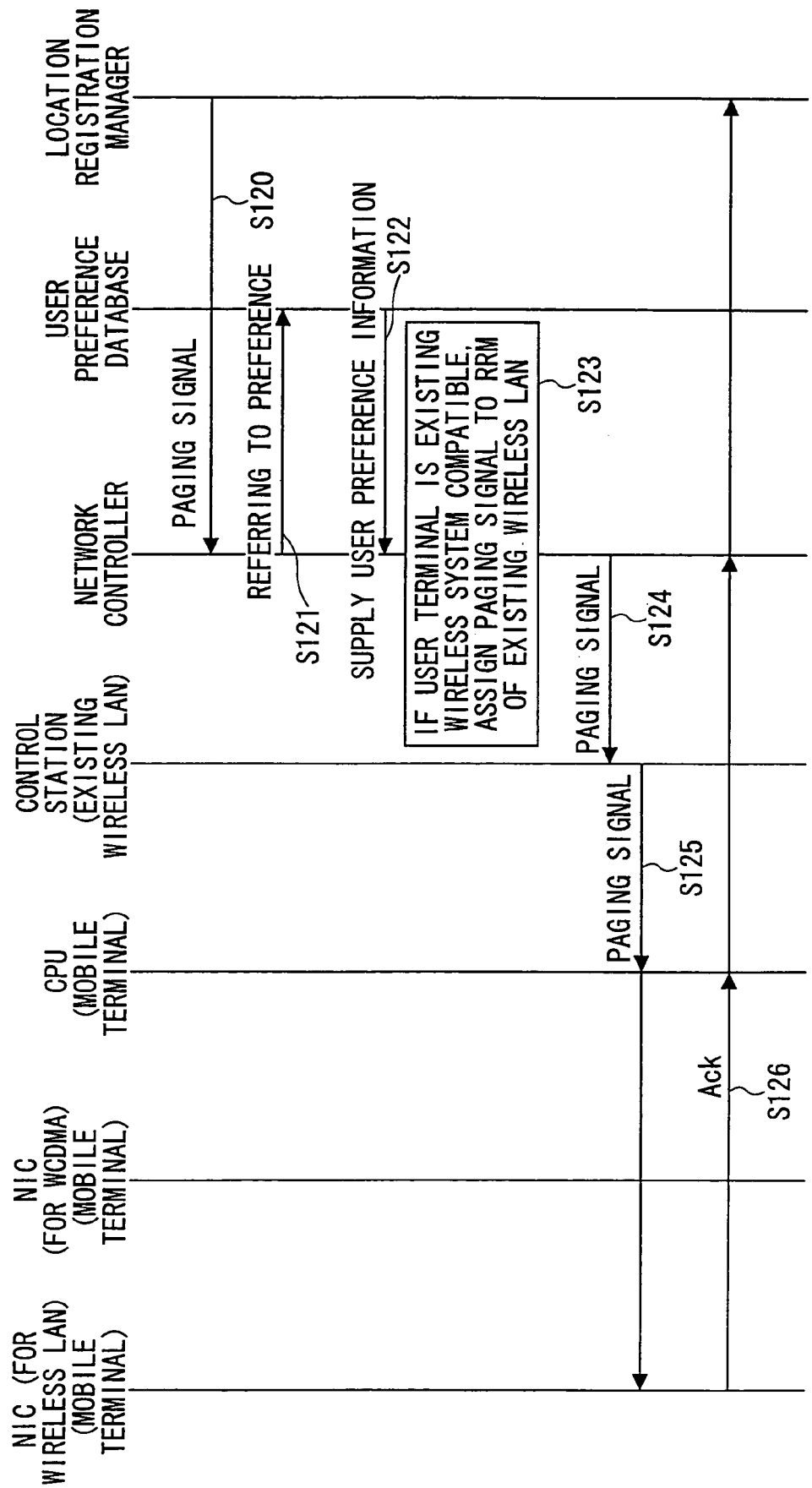
FIG. 17 is a sequence diagram of the paging procedure in an existing wireless LAN system.

FIG. 17 is a sequence diagram of the paging procedure. When the network controller 125 receives a paging signal from the location registration manager 126 (S120), it refers to the user preference management database 127 (S121) in order to determine whether the mobile terminal 10 to be paged is capable of communicating with an existing wireless communication system or a new wireless communication system (S121). An example of user preference management database 127 is illustrated in FIG. 18. The user preference management database 127 stores wireless schemes, presence or absence of location registration area peculiar to the associated wireless scheme, user subscription information for each of the wireless schemes, and user preference information representing priority wireless scheme in use.

The network controller 125 receives user preference information from the user preference management database 127 for the above-described determination. If it is determined that the mobile terminal 10 to be paged is capable of communicating with an existing wireless communication system, the network controller 125 converts the common location registration ID managed by the location registration manager 126 into the location registration ID unique to that existing wireless communication system. In the example shown in FIG. 16, the common location registration ID "1" is converted to the location registration ID "α" of the existing wireless LAN system. The network controller 125 manages the geographic local area (such as an area corresponding to ID=α) controlled by each access point of an existing wireless system in association with the common location registration ID. Accordingly, the network controller 123 can easily determine whether the paging request is addressed to an existing wireless communication system or a new wireless communication system.

After the conversion of the location registration ID, the network controller 125 assigns the paging signal containing the location registration ID=α to the control station 47 of the existing wireless LAN system (S123), and transmits this paging signal to this control station 47 (S124). After that, a paging signal is transmitted from the access point AP at which the mobile terminal 10 is located to the mobile terminal 10 (S125). Upon receiving the paging signal, the mobile terminal 10 returns acknowledgement ACK to the location registration manger 126 via the network controller 125 (S126).

If the mobile terminal 10 is located in the overlapping area between wireless scheme A and wireless scheme B, a wireless scheme to which paging is carried out is determined based on the user preference set by the user of the mobile terminal 10. For example, if the user sets the preference such that paging is carried out using the wireless scheme with the highest frequency in use, paging is carry out in accordance with the order of the frequency in use. This arrangement is explained below in more detail.

If there is a call to the mobile terminal that is currently located in the area in which the wireless zones of wireless scheme A and wireless scheme B overlap each other, the network controller 125 refers to the user preference information stored in the user preference management database 127. The network controller 125 selects a wireless scheme with the highest priority in use, to which paging is to be conducted first. In the example shown in FIG. 18, the priority in use is set higher for wireless scheme A than wireless scheme B, and accordingly, paging to the wireless scheme A is carried out first. Since the paging order is defined in the table, simultaneous paging to multiple wireless schemes is avoided, and the radio resources are used efficiently.

In this manner, when a call is made to the mobile terminal 10 that is currently located in the area covered by heterogeneous wireless schemes, the network controller 125 refers to the user preference management database 127, and transmits the paging signal to the wireless scheme with the highest priority (or preference) in use, without degrading handiness of the mobile terminal 10.

In the above-described embodiments, a location registration ID is converted to a common location registration ID that is common to cells controlled by access points AP of heterogeneous wireless systems. However, the invention is not limited to this example. The location registration ID may be converted to a common location registration ID that is common to a unit registration area consisting of multiple cells.

In the embodiments, the mobile terminal 10 is furnished with multiple network interface cards (NICs), each storing a communication protocol and other information of one of wireless communication systems, and communication with different types of communication protocol is realized by switching NICs. However, the present invention is not limited to this example. For example, network interface software may be downloaded from an external server. In this case, software describing an appropriate protocol suitable to the situation is automatically downloaded to the mobile terminal 10, and the user does not have to carry multiple network interface cards. Consequently, the operability and handiness of the mobile terminal 10 are further improved.

The network controller 125 functions as a network controlling apparatus or a node on the network. The combination of the network controller 125 and the functional entities may form the network controlling apparatus.

The coordinating (or agent) function of the network controller 125 implements signal transmitting/receiving means, protocol converting means, entity communication control means, entity selecting means, format converting means, information value converting means, signal assigning means, location registration ID managing means, location registration ID converting means, broadcasting means, location registration means, and paging signal assigning means.

The combination of the network controller 125 and the location registration manager 126 realizes the location registration function. The mobile terminal 10 has a radio resource information collecting/reporting function. The CPU 15 of the mobile terminal 10 functions as location registration status managing means. The radio network controller (RNC) functions as a control station.

With the invention, the control signal transmitted from the mobile terminal is analyzed by the prescribed network node (that is, the network controller in the embodiments), and converted to a common format that is independent of wireless schemes of heterogeneous wireless systems. The network node communicates with various functional entities implementing network control using the common format. Accordingly, differences in heterogeneous wireless systems are concealed. Mutual connectivity using the control signal is guaranteed under the heterogeneous wireless environment, without adding a specific interface to the functional entities for each of the wireless systems. In conclusion, network management is realized in a rational manner.

By controlling location registration using a common location registration ID, power consumption of the mobile terminal is reduced and location registration is managed on the network in a unified manner even in a heterogeneous wireless environment.

This patent application is based on and claims the benefit of the earlier filing dates of Japanese Patent Application No. 2003-47762 filed Feb. 25, 2003, and Japanese Patent Application No. 2003-179814 filed Jun. 24, 2003, the entire contents of which are hereby incorporated by reference.

What is claimed is:

1. A network control system for controlling connection of a mobile terminal to a network that accommodates a plurality of wireless systems, the network control system including a prescribed node provided on the network, the node comprising:

signal transmitting/receiving means that transmits and receives a control signal defined by each of the wireless systems;

protocol converting means that converts the control signal to a common protocol independent of each of the wireless systems;

entity communication controlling means that communicates with a plurality of functional entities provided on the network, using the common protocol, to implement network control using the common protocol;

location registration ID managing means that manages a common location registration ID allocated in common to service areas defined by wireless access points of the multiple types of wireless systems;

broadcasting means that causes the wireless access points to broadcast the common location registration ID; and location registration means that carries out location registration using the common location registration ID upon receiving a location registration request from the mobile terminal currently located in one of the service areas.

2. The network control system of claim 1, wherein the functional entities are software entities providing at least one of a mobile manager, a routing manager, a session manager, a QoS manager, a security manager, an authentication manager, a link control manager, and a location registration manager.

3. A network control apparatus provided on a network to control connection of a mobile terminal that moves across multiple types of wireless systems, comprising:

signal transmitting/receiving means that transmits and receives a control signal defined by each of the wireless systems;

protocol converting means that converts the control signal to a common protocol independent of each of the wireless systems;

entity communication controlling means that communicates with a plurality of functional entities provided on the network to implement network control using the common protocol;

location registration ID managing means that manages a common location registration ID allocated in common to service areas defined by wireless access points of the multiple types of wireless systems;

broadcasting means that causes the wireless access points to broadcast the common location registration ID; and location registration means that carries out location registration using the common location registration ID upon receiving a location registration request from the mobile terminal currently located in one of the service areas.

4. The network control apparatus of claim 3, wherein the protocol converting means analyzes the received control signal and converts the signal format of the control signal according to a prescribed rule.

5. The network control apparatus of claim 4, wherein the protocol converting means further converts a value set in the received control signal into a predetermined value according to the prescribed rule.

6. The network control apparatus of claim 3, wherein the entity communication controlling means assigns and transmits the protocol-converted control signal to one of the functional entities according to a prescribed rule.

7. The network control apparatus of claim 3, wherein the entity communication controlling means receives the control signal containing information about wireless quality of a downlink signal from the mobile terminal, the downlink signal being transmitted from a wireless access point of each of the wireless systems to the mobile terminal, and wherein the entity communication controlling means selects one of the functional entities that implements routing management based on information, and communicates with the selected functional entity using the common protocol.

8. The network control apparatus of claim 3, further comprising:

location registration ID converting means that converts a location registration ID contained in a location registration request transmitted from the mobile terminal into a common location registration ID that is common to service areas defined by wireless access points of the multiple types of wireless systems, wherein the entity communication controlling means assigns and transmits the common location registration ID to one of the functional entities that has a location registration managing function.

9. The network control apparatus of claim 3, further comprising:

location registration ID converting means that converts a location registration ID contained in the location registration request into the common location registration ID, wherein the entity communication control means assigns and transmits the common location registration ID to one of the functional entities that has a location registration managing function.

10. The network control apparatus of claim 3, further comprising:

location registration managing means that manages a local location registration area of an existing wireless system in association with a location registration area having the common location registration ID.

11. The network control apparatus of claim 3, further comprising:

paging control means that detects a call to the mobile terminal, determine whether the mobile terminal is located in a new wireless system, and pages directly to the wireless access point of the new wireless system when it is determined that the mobile terminal is located in the new wireless system.

12. The network control apparatus of claim 3, further comprising:

paging control means that detects a call to the mobile terminal, refers to a user preference database provided on the network for storing user priority information about the wireless systems, and determines one of the wireless systems to be paged based on the user priority information.

13. The mobile terminal controlled by the network control apparatus of claim 3 and connected to the network and capable of communicating with multiple types of wireless systems, each wireless system having a wireless access point, the mobile terminal comprising:

receiving means that receives a downlink signal from the wireless access point; and radio resource information reporting means that reports information about wireless quality of the downlink signal of the wireless access point, as radio resource information, to a prescribed node on the network.

14. The mobile terminal of claim 13, further comprising:

location registration status managing means that manages information about whether location registration process has been conducted; and location registration request terminating means that terminates a location registration request generated for one of the wireless systems to which the mobile terminal is moving when the location registration process has been conducted.

15. A network control method for controlling connection between a mobile terminal and multiple types of wireless systems accommodated in a network, each of the wireless systems having a wireless access point, the method comprising the steps of:

receiving at a prescribed node on the network a control signal defined by each of the wireless systems;

converting at the prescribed node the control signal to a common protocol having a common format independent of the wireless systems;

carrying out communications between the prescribed node and functional entities provided on the network using the common protocol to implement network control;

managing a common location registration ID allocated in common to service areas defined by wireless access points of the multiple types of wireless systems;

broadcasting, using the wireless access points, the common location registration ID; and carrying out location registration using the common location registration ID upon receiving a location registration request from the mobile terminal currently located in one of the service areas.

* * * * *